Dec. 1, 1953   J. KEINATH ET AL   2,660,919
ENLARGING EASEL
Filed Aug. 10, 1950   3 Sheets-Sheet 2
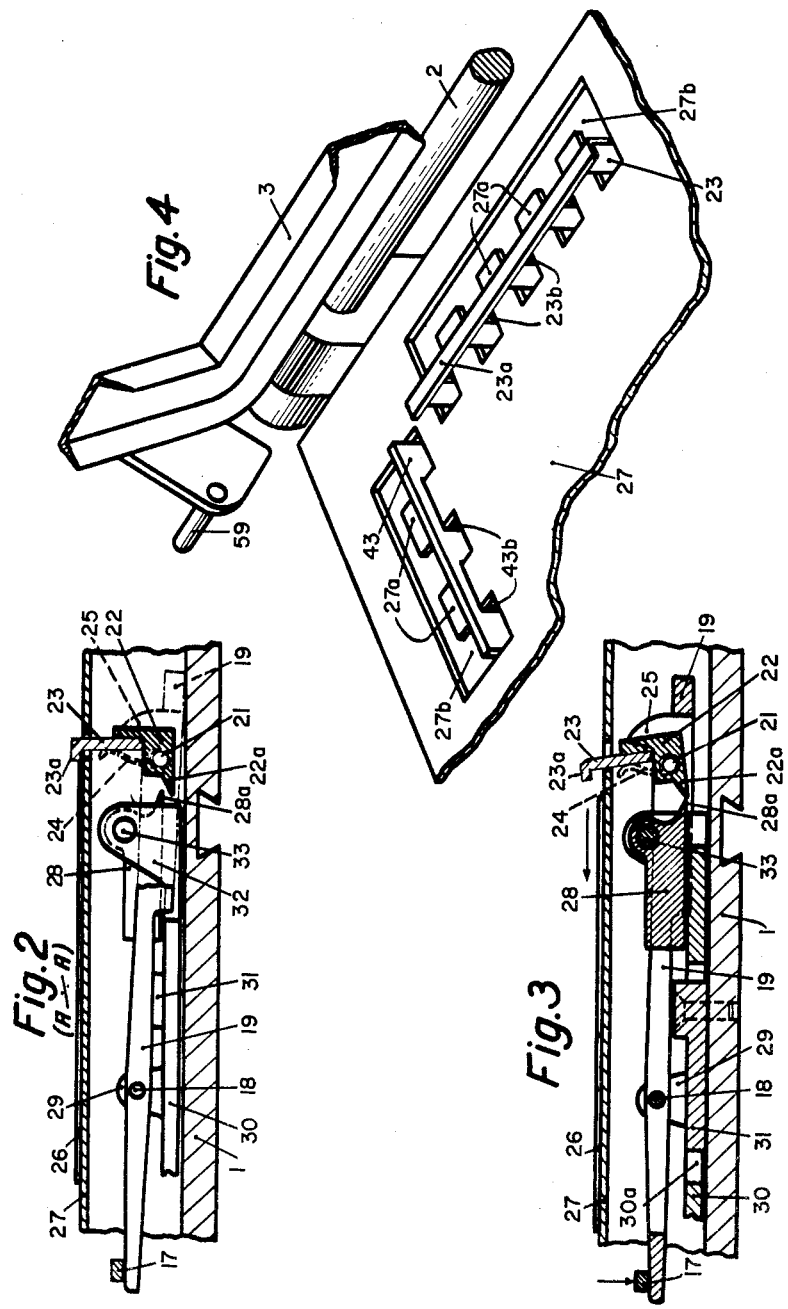
INVENTORS
JOHANNES KEINATH,
MANFRED KÜHN,
FRIEDHELM BOSS and
LUDWIG LEITZ.
BY Ivan E. Königsberg
atty.

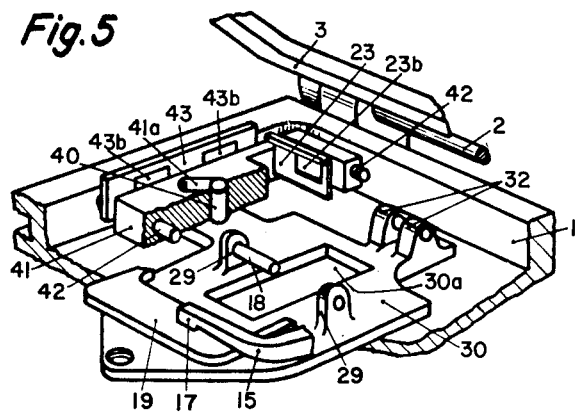
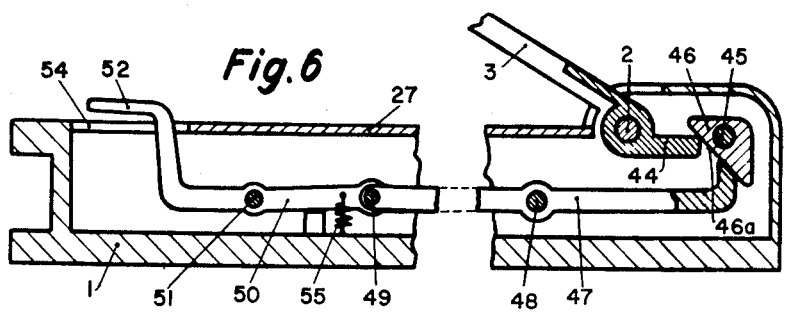
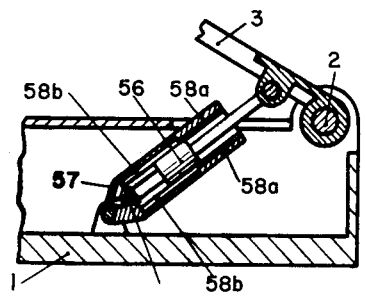

Patented Dec. 1, 1953

2,660,919

UNITED STATES PATENT OFFICE 2,660,919

ENLARGING EASEL

Johannes Keinath, Manfred Kühn, and Friedhelm Boss, Onstmettingen, and Ludwig Leitz, Wetzlar (Lahn), Germany, assignors to Ernst Leitz G. m. b. H., Wetzlar, Germany, a corporation of Germany Application August 10, 1950, Serial No. 178,574
Claims priority, application Germany August 11, 1949

2 Claims. (Cl. 88—24)

This invention relates to an enlarging easel with self-acting ejector of the photographic paper. The object of this invention is to provide an easel which facilitates and accelerates the making of photographic enlargements. The preferred embodiment of the invention enables, moreover, one-armed operators to use the enlarging easel. The easel comprises all elements necessary to its operation and can be used in connection with every enlarging device that is adjustable relative to the base plate.

It is a major object of the invention to provide a new enlarging easel wherein an electromagnetic drive operates raising and lowering the masking frame, the latter being pivotally mounted to brackets on the base plate and fitted with adjustable masking bands defining the size of the picture.

It is another object of the present invention to provide a new enlarging easel wherein the enlarging paper positioned on the base plate rests flush upon the surface thereof and is held in position before the masking frame is closed, whereby the clamping device is engaged to the stop members defining the width of margins of the photographic paper to be inserted.

It is a further object of the present invention to provide a new enlarging easel wherein the hereinabove mentioned clamping device is concomitantly developed as ejector of the exposed photographic paper, both, clamping device and ejector being operated by the electro-magnet in dependance of the movements of the masking frame.

It is also an important object of the present invention to provide a new enlarging easel wherein a member is adapted to hold the photographic paper flat in position as well as to eject the paper after its being exposed, and to serve as a marginal stop being arranged at right angles to a further stop and, together with the latter, adjustable to define the width of the blank margin of the sensitive paper.

A still further object of the invention is to provide a brake whereby the masking frame after being raised by the electro-magnet is arrested after an incipient downward movement until the positioned paper is clamped upon the plate; the frame can be lowered completely only after operating a key. It is hereby accomplished that during the positioning procedure of the photographic paper on the board the masking frame will not strike against the operator's hand. Another execution of the braking device can comprise a piston which is operated by the masking frame and entering a cylinder causes gradual discharge of the enclosed medium in the beginning and thereupon suddenly effects the unhindered outflow of the medium and hereby the accelerated closing of the frame.

Details of the now preferred embodiment of the present invention are illustrated in the accompanying drawings and will be hereinafter more fully described. Referring then to the drawings:

Fig. 2 is a sectional view of Fig. 1 taken along the line A—A, showing the clamping device and the ejector of the paper in the clamping position.

Fig. 3 is a sectional according to Fig. 2 showing the same device in the ejecting position.

Fig. 4 is a perspective view, having parts broken away for clearness, illustrating the arrangement of the paper marginal stops within the base plate.

Fig. 5 is a fragmentary perspective view of the enlarging easel in the region of the marginal stops with the base plate removed for clearness.

Fig. 6 is a sectional view of the enlarging easel illustrating a mechanic brake for the masking frame according to the present invention, the other parts left off for clearness.

Fig. 7 is a sectional detail view of a pneumatic brake to the masking frame according to the present invention.

Figure 1:
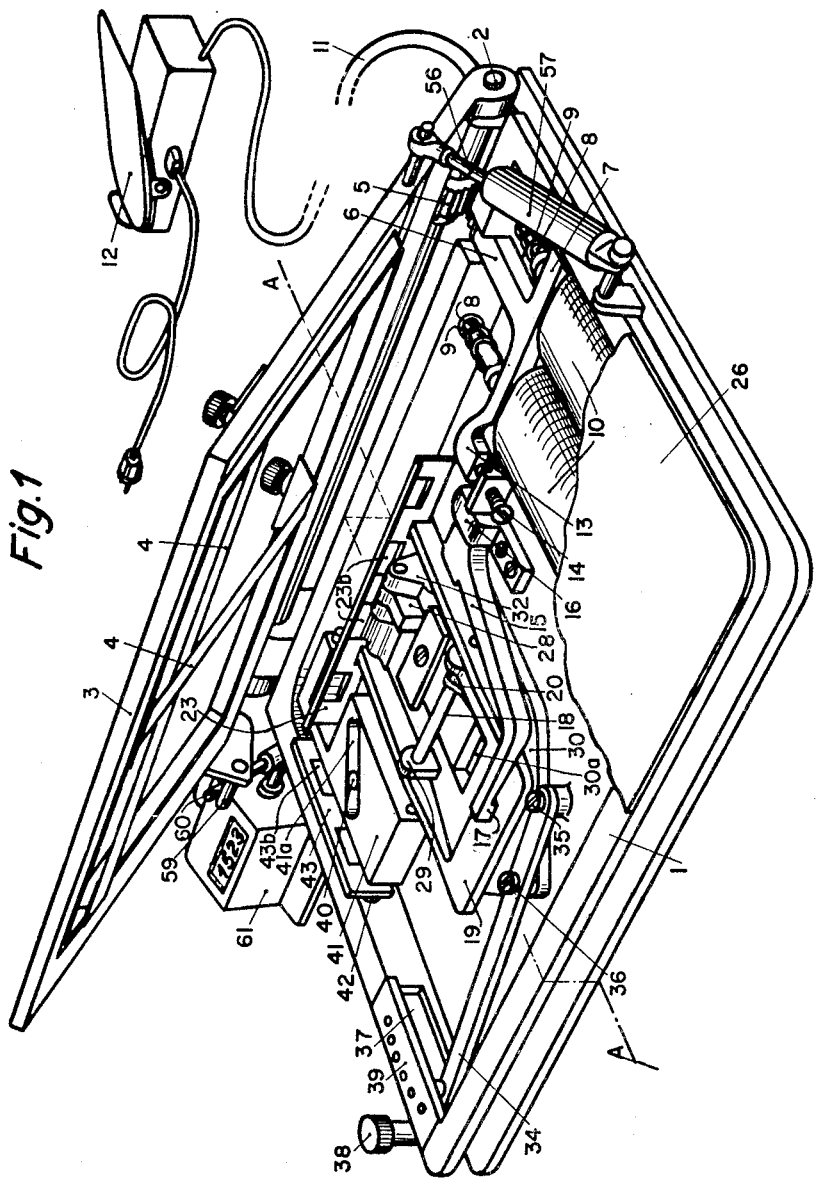
Fig. 1 is a perspective view of the now preferred embodiment of the invention, showing the enlarging easel with raised masking frame, relative to a portion of the base being broken away to expose interior parts.

The enlarging easel comprises a base 1 to the rear portion of which the mask frame 3 is attached, rotatably connected by a pivot 2. A plurality of slidable and fixable masking bands 4 are provided, carried on and co-operating with the mask frame 3 and adapted to define the size of the enlargements.

The pivot 2 of frame 3 is engaged with a gear 5 which operates a rack 6, mounted in the hollow of the base plate 1, and carrying a soft iron armature slidably arranged to the interior portion of the base 1 by means of guiding bolts 8. The said guiding bolts 8 are provided with springs 9, the resilient power of which is adjustable to compensate the weight of the frame 3.

In front of the soft iron armature 7 an electromagnet 10 is arranged in the interior portion of base 1, to be connected with a source of current by cable 11, the latter being furnished with a foot switch 12 to operate the electro-magnet 10.

The armature 7 forms an extension 13 which rests against the adjusting screw 14 of a turning lever 15 which is horizontally pivoted to bracket 16, the latter being rigidly mounted on base 1. The lever 15 is provided with an angular member 17 to rest on a fork-like rocker 19 rotating round the shaft 18 and being under pressure of spring 20 whereby the portion of the rocker 19 opposite the lever arm 17 is constantly pressed downwards against the base 1.

Referring to Figs. 2 and 3, wherein the combination of paper clamping device and ejector are illustrated, it will be noted that the rocker 19 at its end opposite the lever arm 17 carries a shaft 21 upon which is pivoted the bracket 22 carrying the paper stop 23. A spring 24 presses the said stop 23 against the shoulders 25 of the said rocker 19, the stop 23 being provided with an angle 23a which presses the enlarging paper 26 against the platen 27 of the base plate 1, when the rocker 19 is in its lowest position. The bracket 22 of stop 23 has a nose 22a which engages with a further nose 28a on member 28 adapted to anticlockwise rotative movement in one direction by gravity. The lever arm 17 when moved downwards in the direction marked in Fig. 3 by an arrow, lifts after a certain stroke the nose 22a of bracket 22 carrying stop 23 and pushes it against nose 28a of member 28, whereby bracket 22 and stop 23 rotate anticlockwise to eject the enlarging paper 26 into a direction indicated in the drawing by the horizontal arrow. The ejecting position of stop 23 is delineated in Fig. 3. The rocker 19 having returned to its initial position, the spring 24 pushes back the stop 23, pressing it against the shoulders 25 of rocker 19.

Accordingly to Figs. 1, 3 and 5 the bearings 29 for the shaft 18 of rocker 19 are mounted on a slide 30 which slides on the sides of a fixed member 31 directly attached to the base 1 within the opening 30a formed in said slide 30. The latter carries the bearings 32 for the member 28 rotatably mounted on the shaft 33. An adjusting arm 34 pivoted on a bolt 35 mounted on the base 1 and connected with the slide 30 through bolt 36 is adapted to be moved by a hand knob 36 to vary the sliding movement of slide 30. To allow this movement the corresponding portion of the side wall of the base plate forms an opening 37 which is covered by a bar 39 furnished with a number of holes, if necessary gauged to mm., allowing to controllably vary the extention of the movement and to secure the various positions of said slide by inserting the lever into the respective boring.

Referring to Figs. 1 and 5 a bolt 40 is carried by the slide 30. The said bolt 40 slides in a guiding slot 41a of member 41, slidably arranged on shafts 42 journaled in the base, whereby the movement of slide 30 is commuted into a transverse movement of member 41 carrying the paper stop 43 at right angles to stop 23. The slot 41a in member 41 is cut at such an angle that for each movement of slide 30 operated by means of the adjusting arm 34 the stops 23 and 43 move towards the centre of the paper board at equal distances, whereby the width of the blank portion of the sensitive paper can be varied.

The paper stops 23 and 43 move within spaces 23b and 43b between edge portions 27a of the opening 27b cut into the platen 27, by which arrangement the enlarging paper 26 can tightly be clamped at any position of the adjustable marginal bands.

Referring to Fig. 6 the mask frame 3 is pivoted at 2 and provided with a cam 44, operating against the plane 46a of the follower 46 rotatably mounted on shaft 45 journaled to the base. The rocker-like two armed lever 50 is attached to shaft 51 journaled in the base, and forms on its free end a key 52 which is operable through an opening 54 in the platen 27. The lever 50 is acted upon by a spring 55 to press the free end of another lever 47 pivoted at 48 against the follower 46. When the mask frame is raised by the electro-magnet 10, the lever 50 is moved counterclockwise by the spring 55 and the free end of the lever 47 is raised into engagement with the follower 46 thereby preventing accidental closing of the mask frame 3 by engaging the cam 44 thereof. The frame 3 is thus held open until the operator by depressing the key 52 releases the follower 46. The plane surface 46a is so designed that the cam 44 and the end of the lever 47 are always within the range of the surface 46a when the follower is rotated.

As shown by Figs. 1 and 7 the mask frame 3 is pivotally connected to a piston 56 slidably arranged in cylinder 57 which is journaled to the base 1. The cylinder is provided with overflow-channels 58a and 58b, channel 58a having a substantially smaller, channel 58b a comparatively larger diameter. Cylinder 57 is, moreover, provided with a recoil valve 58c which allows the unhindered in-flow of a medium at the backward movement of the piston.

When the mask frame 3 is raised by means of the electro-magnet 10 and the latter switched off by foot-switch 12, the said frame is prevented from rotating downwards by piston 56 which then operates within the range of the smaller over-flow channels 58a. When the piston 56 reaches the portion of the cylinder where the wider dimension channels 58b are effective, the frame moves freely down. To facilitate the unhampered movement to raise the frame 3 the recoil valve 58c is arranged in cylinder 57.

As shown in Fig. 1 the mask frame 3 is provided with a finger 59 which at the upwards movement of the said frame engages a pivoted lever 60 of a counter 61 connected to the base 1 so that the number of the enlargements made in this enlarging easel may be recorded.

In order to facilitate a clearer and fuller understanding of the matter of the present invention, the herein illustrated and now preferred embodiment thereof will be hereinafter prescribed as to its working manner.

It is assumed that the masking frame is closed, a sheet of sensitized paper is positioned underneath the masking bands 4 on the platen 27, the exposure being effected.

At this position of the frame the soft iron armature has its largest distance from the pole-shoes of the electro-magnet 10. The rocker 19 under pressure of its spring 20 presses the angle 23a of the paper stop 23 on the enlarging paper. By switching on the electro-magnet 10 by means of the foot switch 12 the armature 7 is attracted concomitantly moving the rack 6 to the effect that by means of the gear 5 the mask frame is raised. The armature 7 imparts its movement by nose 13 and adjusting screw 14 to the lever 15 which with its arm 17 pushes down the rocker 19. By the rotative movement of the rocker 19 paper stop 23 and its angle 23a are lifted to release the enlarging paper and cause by their further movement the nose 22a, which is carried on bracket 22 to stop 23, to jerk against nose 28a of member 28 whereby bracket 22 and paper stop rotate on their shafts. The sudden rotative movement of the stop tosses the enlarging paper 26 off the platen. The thus ejected paper will suitably be gathered for further treatment.

The related proceedings are rapidly enacted by the action of the electro-magnet. The mask frame executes a rotative movement smaller than 90°. The enlarging paper being ejected another sheet is positioned onto the platen 27 abutting the paper stops 23 and 43, whilst the electro-magnet is switched off by the foot switch 12. The mask frame 3 rotates slowly down under the effect of its own weight which is not entirely balanced by the springs 9, and separates by means of gear 5 and rack 6 the armature from the poles of the electro-magnet 10, which no longer engages the adjusting screw 14 of the lever 15. Rocker 19 under effect of spring 20 swings back, whereby the paper stop is lowered, until the angle 23a clamps the enlarging paper on the paper support. Till this moment the mask frame has effected a slight rotative movement.

After clamping the paper 26 against the platen 27 the retarding effect of the follower 46, 46a takes place and the mask frame 3 will not freely move downwards until the key 52 is pushed down.

The lowered mask frame 3 rests with its clamping bands 4 on the enlarging paper 26 and by its weight presses it firmly against the platen 27. After the exposure has taken place the electromagnet raises the mask frame and the paper is ejected according to the hereinabove mentioned manner. At each function of the masking frame the carrier 59 operates the counter.

If instead of the mechanic brake 46, 46a for the mask frame 3 a pneumatic or hydraulic brake 56—58b is provided, the range of the overflow valves of small diameter 58a corresponds to the range of the rotating movement of the mask frame 3 up to shortly after the moment when the enlarging paper is clamped onto the platen 27.

What is claimed is:

1. A photographic copying apparatus comprising a base, a fixed copy paper receiving platen therein spaced a distance above said base, a masking frame cover swingably pivoted at the rear side of said base to close by gravity upon said platen and paper thereon, an electromagnet including an anchor supported in the base below the platen, gearing means operatively connected to and between said electromagnetic anchor and the said cover to raise the latter into an open position when the electromagnet is energized, a mechanism positioned beneath the platen for clamping copy paper thereto when the cover is closed upon the platen and for ejecting the paper from the platen when the cover is raised comprising a vertically and laterally movable hook adapted to engage the paper, said hook extending from said mechanism beneath the platen through an opening therein to the surface of the platen, a two armed hook-supporting lever pivoted intermediate its ends beneath the platen, one arm of said lever forming a fork for pivotally supporting the said hook therein, the other arm of said two armed lever being free and extending forwardly beneath the platen, a spring acting upon said two armed lever to depress its said forked end and move the said hook vertically downward to clamp the paper to the platen, while said cover is being closed, an abutment supported independent of said forked end within the same in the path of vertical movement of the said hook to tip the latter laterally into a paper ejecting position when said cover is being raised, a right angled lever member pivoted to the said apparatus base, one arm of said member being adapted to contact and depress the said free end of the said two armed lever to move the latter upwardly against the said spring pressure to elevate the forked end thereof and the said hook into paper ejecting position, when said masking frame cover is being raised, said hook being tipped forwardly to eject the paper by hitting the said abutment as said hook is being elevated, the other arm of said right angled lever member being engaged by said electromagnet anchor to actuate said member as aforesaid, means for retarding the downward closing movement of said cover, a manually operated key to release said retarding means for quick closing of said cover and manually operated switch means to energize said electromagnet to attract the anchor to raise the said cover and simultaneously therewith actuate said right angled lever member to cause ejectment of the paper from the platen as aforsaid and to deenergize said electromagnet when said cover has reached its full open raised position.

2. An apparatus according to claim 1 including a slidably supported base support for said paper clamping and ejecting means, a copy paper side registering slide operatively connected to said slidable base support and a manually actuated lever pivoted to said slidable base support for simultaneously moving the same and the said side registering slide to place the copy paper in a selected exposure position on said platen and adjustable bands in said masking frame cover for adjusting the exposure opening therein to correspond with the registered position of the paper on the platen.

JOHANNES KEINATH.
MANFRED KÜHN.
FRIEDHELM BOSS.
LUDWIG LEITZ.

References Cited in the file of this patent
UNITED STATES PATENTS

| Number | Name | Date |
| --- | --- | --- |
| 1,881,791 | Maresh | Oct. 11, 1932 |
| 1,984,898 | Schambach | Dec. 18, 1934 |
| 2,350,831 | Schubert | June 6, 1944 |